(No Model.)
J. L. DURHAM.
PLANTER.
No. 603,757. Patented May 10, 1898.
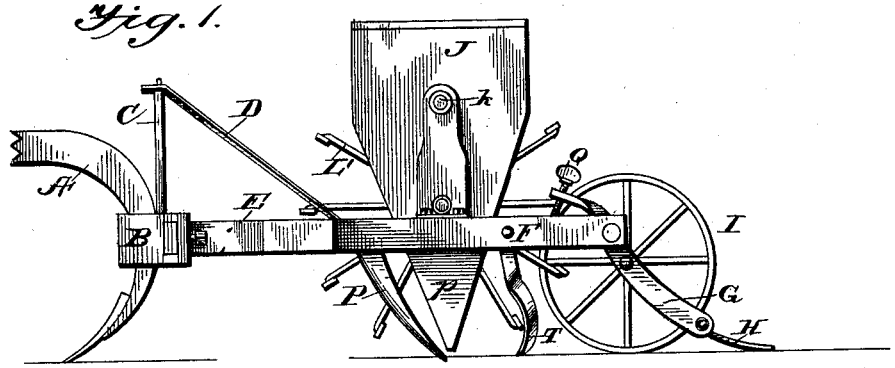
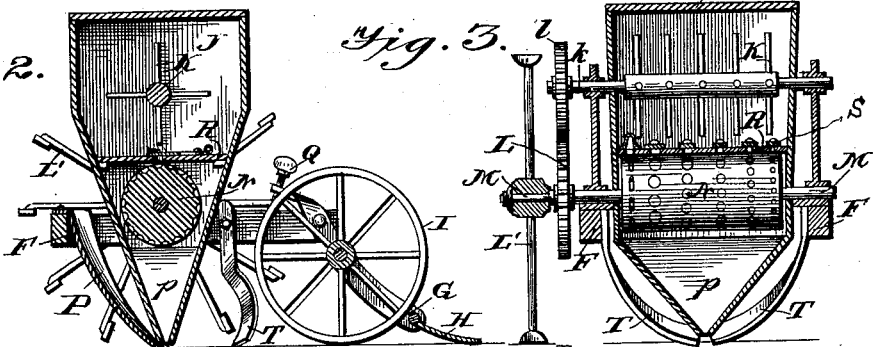
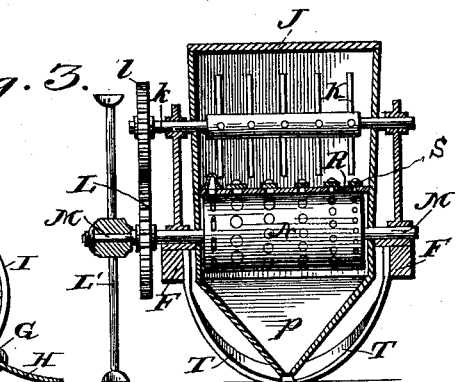
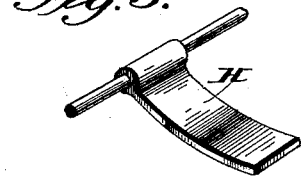
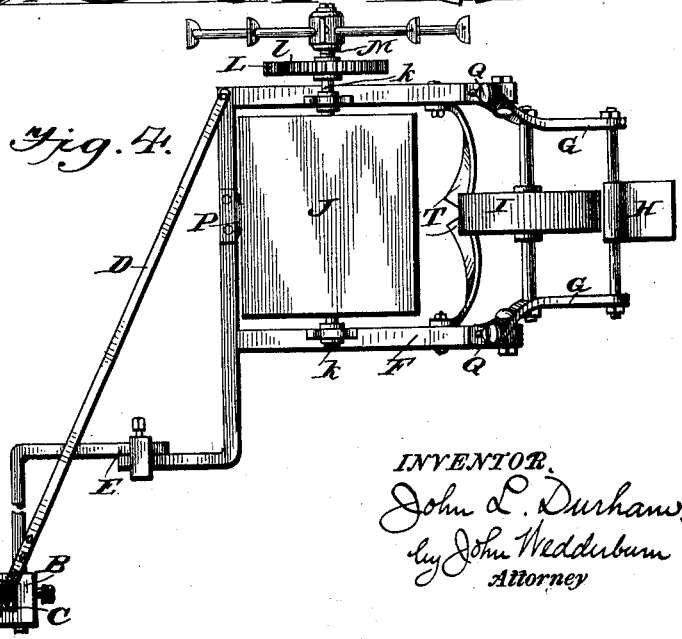
WITNESSES
INVENTOR
John L. Durham
By John Wedderburn
Attorney

UNITED STATES PATENT OFFICE.

JOHN L. DURHAM, OF SANCO, TEXAS.

PLANTER.

SPECIFICATION forming part of Letters Patent No. 603,757, dated May 10, 1898.

Application filed August 20, 1896. Serial No. 603,364. (No model.)

*To all whom it may concern:*

Be it known that I, JOHN L. DURHAM, a citizen of the United States, residing at Sanco, in the county of Coke and State of Texas, have invented certain new and useful Improvements in Planters; and I do hereby declare the following to be a full, clear, and exact description of the invention, such as will enable others skilled in the art to which it appertains to make and use the same.

This invention relates to certain new and useful improvements in planters; and it has for its object, among other, to provide a simple and cheap construction of planter which shall be adapted for use with any and all kinds of grain and seed, can be attached to almost any plow, will plant behind as well as to one side thereof as far as necessary while breaking or bedding, and will drop fertilizer between hills or in the same place with the seed. It is of but few parts, and those readily assembled and of little weight. The amount of seed to be dropped is easily regulated, and but one team and one man or boy are required for its successful operation. It will press dirt on the seed and leave a smooth surface or a loose surface for cotton and the like, as may be required.

Other objects and advantages of the invention will hereinafter appear, and the novel features thereof will be specifically defined by the appended claims.

The invention in this instance resides in the peculiar combinations and the construction, arrangement, and adaptation of parts, all as more fully hereinafter described, shown in the drawings, and then particularly pointed out in the claims.

The invention is clearly illustrated in the accompanying drawings, which, with the letters of reference marked thereon, form a part of this specification, and in which—

Figure 1 is a side elevation of my improved planter. Fig. 2 is a central vertical longitudinal section through the same. Fig. 3 is a vertical cross-section. Fig. 4 is a plan. Fig. 5 is a detail of the presser-foot.

Like letters of reference indicate like parts throughout the several views.

Referring now to the details of the drawings by letter, A designates the plow-stock, to which the planter-frame is designed to be attached.

B is a box or bearing made fast to the plow-stock, and C is an upright rising therefrom, to which is connected the flexible brace D for elevating the planter-frame.

E is a planter-beam, which is made sectional, with the front half reversible for attachment to the plow-stock, the flexible brace being so constructed and mounted as to serve in either position.

F is the frame of the planter. G is a frame mounted on the rear end thereof, and to the rear lower end of this frame is designed to be detachably secured the presser-foot H, which is designed to press the earth on the seed and leave a loose surface in cases where the presser-wheel is not suitable. It is interchangeable with the presser-wheel I, which is also mounted in said frame.

J is the hopper, within which is journaled the agitator K, carried by the shaft $k$, supported by uprights that carry the axle M, also the hopper, and on one end of this shaft is a gear-wheel $l$, which meshes with a gear-wheel L on the axle M of the walking-wheel L'. On this shaft is mounted the dropper-cylinder N, which has several lines of holes in its face, each line having a different size and number of holes, whereby it is adapted for the several kinds and sizes of seeds which it may be wished to plant. It has also one set of fingers for feeding cotton-seed.

P is the furrow-opener, and $p$ the seed-chute, formed as an extension of the hopper.

Q is a screw-regulator for raising and lowering the coverer as occasion may require.

The hopper is provided with a bottom R, each hole therein being covered by a separate cut-off plate, and the slot is covered by a convex cap S.

The plates that cover the various openings and slot are held by set-screws, as shown.

T are two thin pieces bolted to the frame and preferably of steel bent backward and inward behind the opener for covering when planting directly behind the plow. They are not used when planting otherwise.

Modifications in detail may be resorted to without departing from the spirit of the invention or sacrificing any of its advantages.

What is claimed as new is—

1. The combination with the plow-stock, of a bearing, a vertical standard rising therefrom, the planter-frame, a flexible brace adjustably connected to said standard and frame, and a right-angled beam reversibly and detachably connected with the planter-beam and stock, substantially as and for the purpose specified.

2. The combination with the planter-frame and the coverer pivoted to the end thereof, of a presser-head detachably hinged to the rear end of said planter-frame, a presser-wheel journaled therein, the hopper with its feed mechanism, the furrow-opener, the screw-regulators for adjusting the same, and the chute connected with said opener, all substantially as herein shown and described.

3. The combination with the planter-frame, the presser-wheel mounted therein, the pivotally-mounted presser-plate in line with said wheel, the opener and the coverer, plates secured to opposite sides of the planter-frame and bent backward and inward behind the opener, all substantially as herein shown and described.

In testimony whereof I have signed this specification in the presence of two subscribing witnesses.

JOHN L. DURHAM.

Witnesses:
G. W. PAYNE,
W. K. PAYNE.